(12) United States Patent
Stanhope et al.

(10) Patent No.: US 11,246,257 B2
(45) Date of Patent: Feb. 15, 2022

(54) SYSTEM AND METHOD FOR REDUCING MATERIAL ACCUMULATION RELATIVE TO A CLOSING ASSEMBLY OF AN AGRICULTURAL IMPLEMENT

(71) Applicant: CNH Industrial America LLC, New Holland, PA (US)

(72) Inventors: Trevor Stanhope, Palos Hills, IL (US); Joshua David Harmon, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 292 days.

(21) Appl. No.: 16/456,129

(22) Filed: Jun. 28, 2019

(65) Prior Publication Data

US 2020/0404833 A1   Dec. 31, 2020

(51) Int. Cl.
*A01B 79/00* (2006.01)
*A01B 63/00* (2006.01)
*A01C 5/06* (2006.01)

(52) U.S. Cl.
CPC .......... *A01B 79/005* (2013.01); *A01B 63/004* (2013.01); *A01B 63/008* (2013.01); *A01C 5/068* (2013.01)

(58) Field of Classification Search
CPC ... A01B 79/005; A01B 63/004; A01B 63/008; A01B 79/00; A01B 63/002; A01B 63/00; A01C 5/068; A01C 5/066; A01C 5/06; A01C 5/00
See application file for complete search history.

(56) References Cited

U.S. PATENT DOCUMENTS

| | | |
|---|---|---|
| 8,408,149 B2 | 4/2013 | Rylander |
| 9,485,900 B2 | 11/2016 | Connell et al. |
| 9,775,274 B2 | 10/2017 | Steinlage et al. |
| 9,814,171 B2 | 11/2017 | Janelle et al. |
| 2016/0374258 A1 | 12/2016 | Schaffert |
| 2017/0112043 A1 | 4/2017 | Nair et al. |
| 2018/0049362 A1 | 2/2018 | Totten et al. |
| 2019/0373797 A1* | 12/2019 | Schoeny ............... A01C 7/203 |

\* cited by examiner

*Primary Examiner* — Christopher J. Novosad
(74) *Attorney, Agent, or Firm* — Rebecca L. Henkel; Rickard K. DeMille (57) ABSTRACT

In one aspect, a method for reducing material accumulation relative to a closing assembly of an agricultural implement may include receiving an input associated with an amount of material accumulation relative to the closing assembly. Additionally, the method may include controlling an operation of the implement based on the received input such that at least one of a first closing tool or a second closing tool of the closing assembly moves from a working position to a material removal position to reduce an amount of material accumulation relative to the closing assembly. The method may also include controlling an operation of an actuator of the implement to actuate the at least one of the first closing tool or the second closing tool from the material removal position back to the working position.

20 Claims, 9 Drawing Sheets

SYSTEM AND METHOD FOR REDUCING MATERIAL ACCUMULATION RELATIVE TO A CLOSING ASSEMBLY OF AN AGRICULTURAL IMPLEMENT

FIELD OF THE INVENTION

The present subject matter relates generally to agricultural implements, and more particularly, to a system and an associated method for reducing material accumulation relative to a closing assembly of an agricultural implement during the performance of an agricultural operation.

BACKGROUND OF THE INVENTION

Modern farming practices strive to increase yields of agricultural fields. In this respect, certain agricultural implements, such as seed-planting implements, are towed behind a tractor or other work vehicle for planting. A seed-planting implement typically includes one or more ground engaging assemblies configured to work the soil as the implement is moved across a field. For example, in certain configurations, the implement may include one or more opening assemblies that form a trench or furrow within the soil as the implement is moved across the field. Furthermore, the implement may also include one or more closing assemblies that close the furrow while the implement is moved across the field. In this regard, the function(s) of the ground engaging tool(s) requires or relies upon movement of the field materials, such as soil and/or crop residue, relative to the assemblies.

Typically, the ground engaging assemblies are configured to work the soil in a specific way. For example, each closing assembly may include a pair of closing tools, with the closing tools being configured to work together to sufficiently close a furrow over a seed placed in the furrow. As agricultural operations are performed, excessive amounts of field material may build up or accumulate relative to the closing assemblies, for example, in front of, between, or behind the closing tools of the closing assemblies. Such material accumulation can limit or prevent the closing tools from properly closing the furrow, which negatively affects yields.

Accordingly, an improved system and method for reducing material accumulation relative to a closing assembly of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing material accumulation relative to a closing assembly of an agricultural implement. The closing assembly includes first and second closing tools that are configured to engage soil within a field as the agricultural implement is moved across the field. The method includes receiving, at the computing device, an input associated with an amount of material accumulation relative to the closing assembly. Further, the method includes controlling, with the computing device, an operation of the implement based on the received input such that at least one of the first closing tool or the second closing tool moves from a working position to a material removal position to reduce an amount of material accumulation relative to the closing assembly. Additionally, the method includes controlling, with the computing device, an operation of an actuator of the implement to actuate the at least one of the first closing tool or the second closing tool from the material removal position back to the working position.

In some aspects, the present subject matter is directed to a method for reducing material accumulation relative to a ground engaging assembly of an agricultural implement. The ground engaging assembly includes first and second ground engaging tools configured to rotate relative to and engage soil within a field as the agricultural implement is moved across the field. The method includes receiving, at the computing device, an input associated with material accumulation relative to the ground engaging assembly. Further, the method includes controlling, with the computing device, an operation of an actuator of the implement based on the received input to actuate at least one of the first ground engaging tool or the second ground engaging tool from a working position to a material removal position to reduce an amount of material accumulation relative to the ground engaging assembly. Additionally, the method includes controlling, with the computing device, an operation of the actuator of the implement to actuate the at least one of the first ground engaging tool or the second ground engaging tool from the material removal position to the working position.

Additionally, in some aspects, the present subject matter is directed to a system for reducing material accumulation relative to a closing assembly of an agricultural implement. The system includes first and second closing tools configured to engage soil within a field as the agricultural implement is moved across the field. The system further includes an actuator configured to actuate at least one of the first closing tool relative or the second closing tool between a working position and a material removal position. Additionally, the system includes a controller configured to control an operation of the implement such that the at least one of the first closing tool or the second closing tool moves from the working position to the material removal position upon receiving an input associated with material accumulation relative to the closing assembly and to control an operation of the actuator to actuate the at least one of the first closing tool or the second closing tool from the removal position to the working position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for reducing material accumulation relative to a ground engaging assembly an agricultural implement, such as a closing assembly of the implement. Specifically, in several embodiments, as the implement is being moved across a field, one or more the closing tool(s), such as one or more pairs of closing discs, are configured to engage the soil of the field to close one or more furrows. Depending on the field or operating conditions, the closing assembly may experience "plugging," or excessive material accumulation of soil, residue, and/or other field materials relative to the closing assembly to the point where the closing tools cannot properly close the furrow(s).

In accordance with aspects of the present subject matter, when material accumulation or plugging occurs relative to the closing assembly, at least one the closing tools of the closing assembly may be temporarily moved or actuated to reduce the material accumulation relative to the closing assembly. For example, in one embodiment, an actuator may be configured to move at least one of the closing tools between a working position, in which the closing tool assists in closing the furrow, and a material removal position, in which the closing tool does not assist or only partially assists in closing the furrow to help reduce the material accumulation relative to the closing assembly.

In some embodiments, each of the closing tools is configured to rotate about a respective rotational axis defined by a respective pivot point. In which case, the actuator may be configured to increase the lateral distance between the pivot points (e.g., centers) of adjacent closing tools to help reduce the amount of accumulated material relative to the closing assembly. Alternatively, in some embodiments, the actuator may be configured to increase the vertical distance between the rotational axes of adjacent closing tools to help reduce the amount of accumulated material relative to the closing assembly. Further, in some embodiments, the actuator may be configured to increase both the lateral distance between the centers and the vertical distance between the rotational axes of adjacent closing tools to help reduce the amount of accumulated material relative to the closing assembly.

In an embodiment, a controller of the disclosed system may be configured to automatically control the operation of the actuator to facilitate "de-plugging" of the closing assembly. For example, the controller may be communicatively coupled to one or more sensors configured to measure parameters associated with material accumulation relative to the closing tools, such as by detecting a rotational speed of at least one of the closing tools of the closing assembly, and/or by providing vision-based data indicative of the material accumulation relative to the closing assembly.

Figure 1:
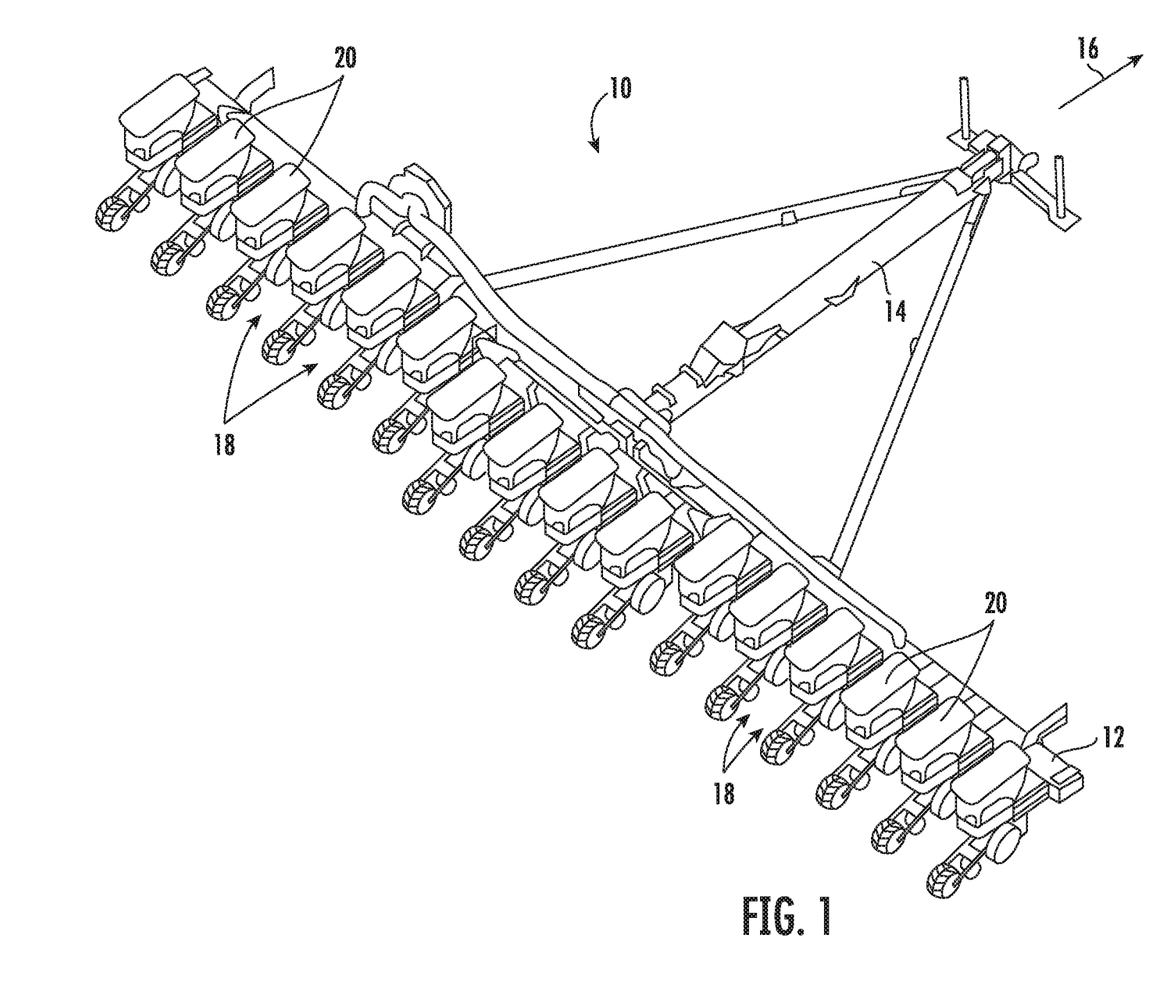
FIG. 1 illustrates a perspective view of one embodiment of an agricultural implement in accordance with aspects of the present subject matter.

Referring now to the drawings, FIG. 1 illustrates a perspective view of one embodiment of an agricultural implement 10 in accordance with aspects of the present subject matter. It should be appreciated that, although the implement 10 illustrated herein corresponds to a planter, the implement 10 may generally correspond to any suitable equipment or implement, such as a seeder (e.g., a seed disk drill) or another seed dispensing implement, a side dresser or another fertilizer dispensing implement, a strip tiller, a tillage implement (e.g., a disk harrow), and/or the like.

As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks (not shown) may store agricultural fluids, such as insecticides, herbicides, fungicides, fertilizers, and/or the like.

It should be appreciated that, in general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

It should also be appreciated that the configuration of the agricultural implement 10 described above and shown in FIG. 1 is provided only to place the present subject matter in an exemplary field of use. Thus, it should be appreciated that the present subject matter may be readily adaptable to any manner of implement configuration.

Figure 2:
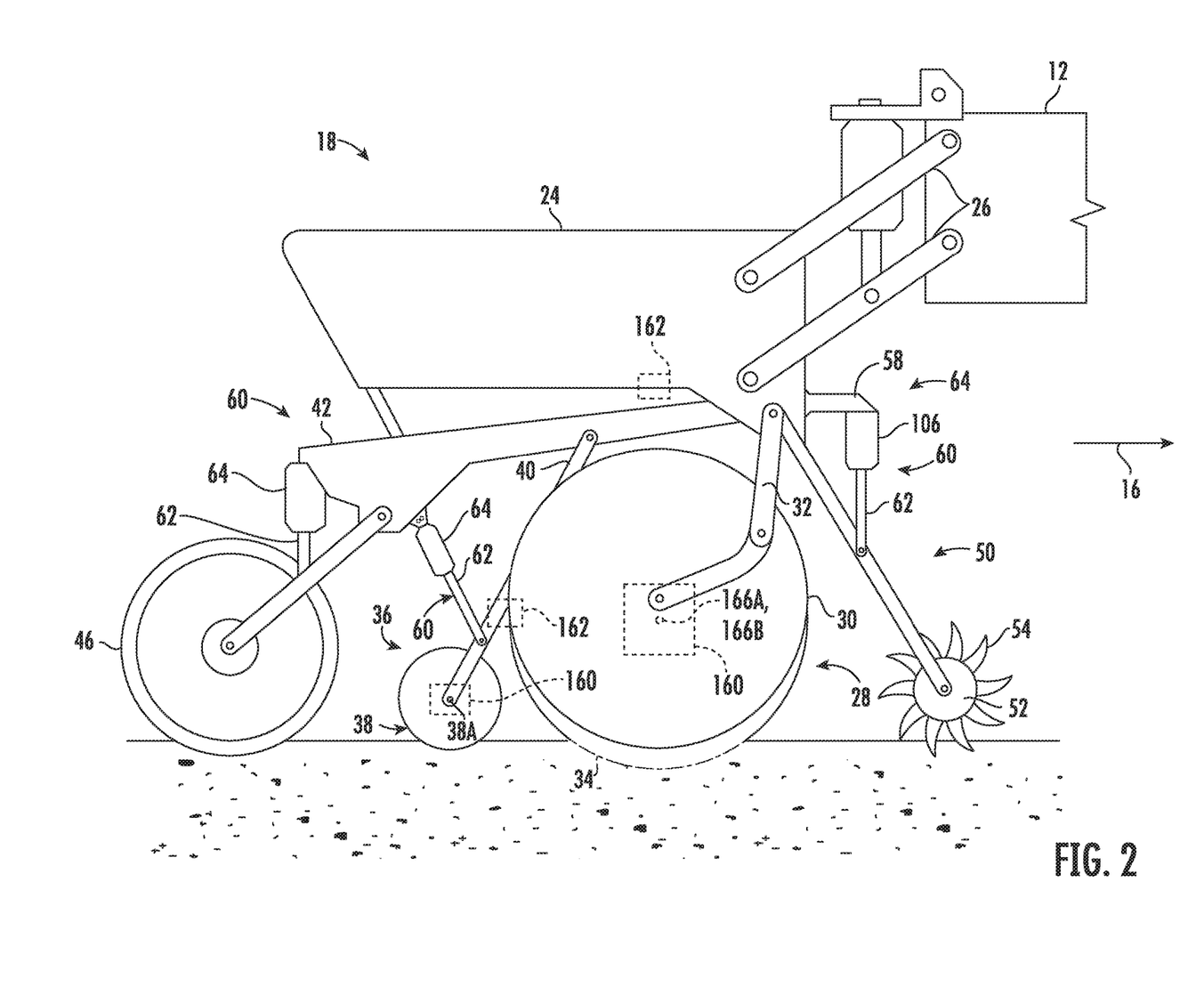
FIG. 2 illustrates a side view of one embodiment of a row unit suitable from use with an agricultural implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner. For example, the links 26 may be fixedly coupled to the frame 24 and/or the links 26 may be non-parallel. Additionally, in a further embodiment, the implement 10 may not include the links 26. In such instance, the implement 10 may include other components for coupling each row unit 18 to the toolbar 12.

As shown in FIG. 2, the row unit 18 also includes a furrow opening assembly 28. In one embodiment, the furrow opening assembly 28 may include a gauge wheel 30 and a pair of opening tools 34 (only one of which is shown) configured to be positioned relative to each other in a manner that excavates a furrow or trench in the soil. For example, in the embodiment of the opening assembly 28 shown, the opening tools 34 are configured as disc openers. In this regard, the opening tools 34 will be referred to hereafter as "disc openers 34," for the sake of simplicity and without intent to limit. As is generally understood, the gauge wheel 30 may be configured to engage the top surface of the soil as the implement 10 is moved across the field. In this regard, the height of the disc openers 34 may be adjusted with respect to the position of the gauge wheel 30 to set the desired depth of the furrow being excavated. Furthermore, the furrow opening assembly 28 may include a support arm 32 configured to adjustably couple the gauge wheel 30 and the disc openers 34 to the frame assembly 24. For example, one end of the support arm 32 may be pivotably coupled to the gauge wheel 30 and the disc openers 34, while an opposed end of the support arm 32 may be pivotably coupled to the frame 24. However, it should be appreciated that, in alternative embodiments, the gauge wheel 30 and the disc openers 34 may be coupled to the frame 24 in any other suitable manner. Furthermore, it should be appreciated that, in alternative embodiments, the furrow opening assembly 28 may include any other suitable number of disc openers 34, such as one disc opener 34 or three or more disc openers 34.

Moreover, as shown, the row unit 18 may include a furrow closing assembly 36. Specifically, in several embodiments, the furrow closing assembly 36 may include a pair of closing tools 38 (only one of which is shown) positioned relative to each other in a manner that permits soil to flow between the pair of closing tools 38 as the implement 10 is being moved across the field. As such, the pair of closing tools 38 may be configured to close the furrow after seeds have been deposited therein, such as by pushing the excavated soil into the furrow. For example, in the embodiment of the closing assembly 36 shown, the pair of closing tools 38 are configured as closing discs. In this regard, the closing tools 38 will be referred to hereafter as "the closing discs 38," for the sake of simplicity and without intent to limit. Furthermore, the furrow closing assembly 36 may include a support arm 40 configured to adjustably couple the closing discs 38 to the frame assembly 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs, such as one closing disc or three or more closing discs.

Additionally, in some embodiments, the closing assembly 36 may include one or more press wheels 46 (only one of which is shown) configured to roll over the closed furrow to firm the soil over the seed and promote favorable seed-to-soil contact. Furthermore, a support arm 48 may be configured to adjustably couple the press wheel(s) 46 to the frame assembly 24. For example, one end of the support arm 48 may be pivotably coupled to the press wheel(s) 48, while an opposed end of the support arm 48 may be pivotably coupled to the chassis arm 42, which is, in turn, coupled to the frame 24. However, it should be appreciated that, in alternative embodiments, the press wheel(s) 46 may be coupled to the frame 24 in any other suitable manner.

Furthermore, in an embodiment, a residue removal device 50 may be positioned at the forward end of the row unit 18 relative to the direction of travel 16. In this regard, the residue removal device 50 may be configured to break up and/or sweep away residue, dirt clods, and/or the like from the path of the row unit 18 before the furrow is formed in the soil. For example, in one embodiment, the residue removal device 50 may include a residue removal wheel 52 having a plurality of tillage points or fingers 54. As such, the wheel 52 may be configured to be positioned relative to each other such that the fingers 54 break up and/or sweep away residue and dirt clods. Additionally, the residue removal device 50 may include a support arm 56 configured to adjustably couple the residue removal wheel 52 to the frame assembly 24. For example, one end of the support arm 56 may be pivotably coupled to the wheel 52, while an opposed end of the support arm 56 may be pivotably coupled to the frame 24. However, it should be appreciated that, in alternative embodiments, the residue removal wheel 52 may be coupled to the frame 24 in any other suitable manner. Furthermore, it should be appreciated that, in alternative embodiments, the residue removal device 50 may include any other suitable number of residue removal wheels 52. For example, in one embodiment, the residue removal device 50 may have two or more residue removal wheels 52.

In several embodiments, the row unit 18 may include one or more actuators 60. Specifically, each actuator 60 may be configured to adjust to the position of a rotating ground engaging tool of the row unit 18 relative to the frame 24. For example, in one embodiment, a first end of each actuator 60 (e.g., a rod 62 of each actuator 60) may be coupled to an arm on which the rotating ground engaging tool is mounted, while a second end of each actuator 60 (e.g., the cylinder 64 of each actuator 60) may be coupled to the chassis arm 42 or a bracket 58, which are, in turn, coupled to the frame 24. The rod 62 of each actuator 60 may be configured to extend and/or retract relative to the corresponding cylinder 64 to adjust the downforce being applied to and/or the penetration depth of the associated rotating ground engaging tool. In one embodiment, the actuator(s) 60 may correspond to a fluid-driven actuator(s), such as a hydraulic or pneumatic cylinder(s). However, it should be appreciated that the actuator(s) 60 may correspond to any other suitable type of actuator(s), such as an electric linear actuator(s). As used herein, a rotating ground engaging tool may be any tool of the implement 10 configured to rotate relative to the soil as the implement 10 is moved across a field.

As shown in FIG. 2, the actuator(s) 60 may be configured to adjust the downforce being applied to and/or the penetration depth of any number of rotating ground engaging tools of the row unit 18. Specifically, in several embodiments, the actuator(s) 60 may configured to adjust the downforce being applied to one or more rotating ground engaging tools of the furrow opening assembly 28, the furrow closing assembly 36, and/or the residue removal device 50. For instance, as shown in the illustrated embodiment, an actuator 60 associated with the closing disc(s) 38 may configured to adjust the downforce being applied to the closing disc(s) 38 to adjust the penetration depth of the closing disc(s) 38. Additionally, the actuator(s) 60 may be provided in operative association with any other suitable rotating ground engaging tools of the row unit 18, such as the disc opener(s) 34 or the residue removal wheel(s) 52.

As will be described below, the row unit 18 may additionally include one or more sensors 160, 162 configured to capture data indicative of material accumulation relative to the closing assembly 36. In one embodiment, the sensors 160, 162 may be used as part of an automatic control system with one or more other elements of the row unit 18 (e.g., one or more downforce actuators 60 or disc actuators 72, 72A) to reduce the material accumulation relative to the closing discs 38 of the closing assembly 36 and/or any other ground engaging tools of the row unit 18. It should be appreciated that, while the control system will be discussed herein with reference to the closing discs 38 of the closing assembly 36, the control system may similarly be configured with respect to adjacent residue removal wheel(s) 52 of the implement 10.

Figure 3:
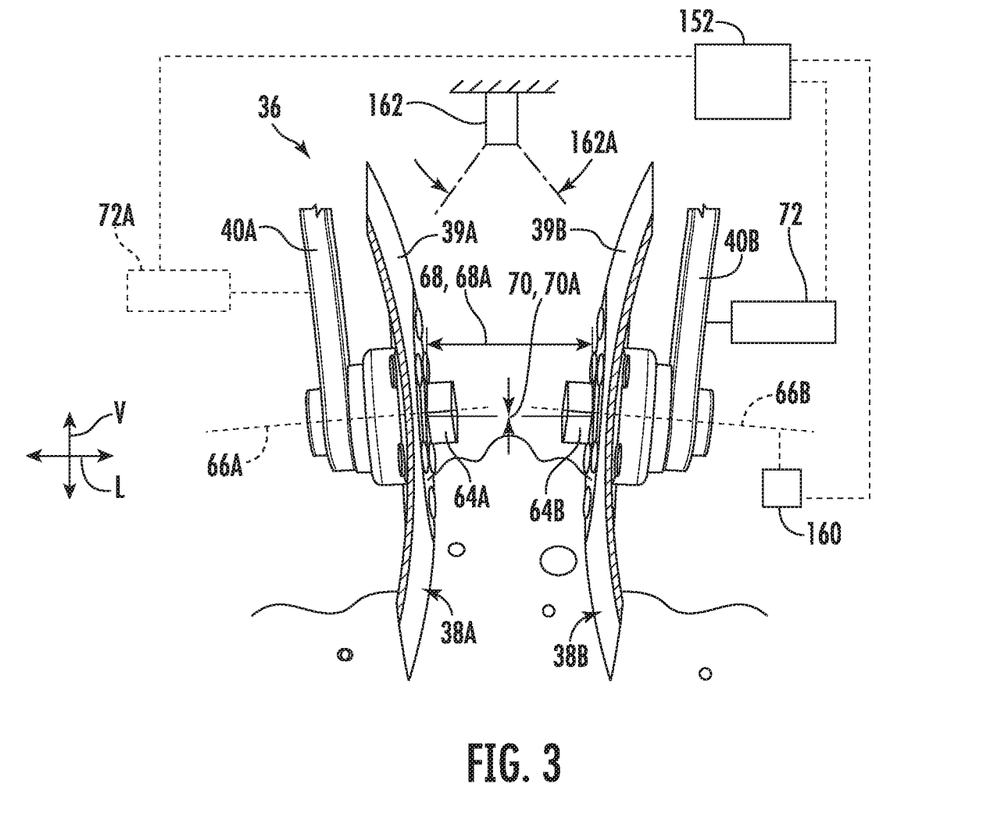
FIG. 3 illustrates a rear view of one embodiment of a closing assembly of an agricultural implement in accordance with aspects of the present subject matter, particularly illustrating material accumulation relative to the closing assembly.
Figure 4:
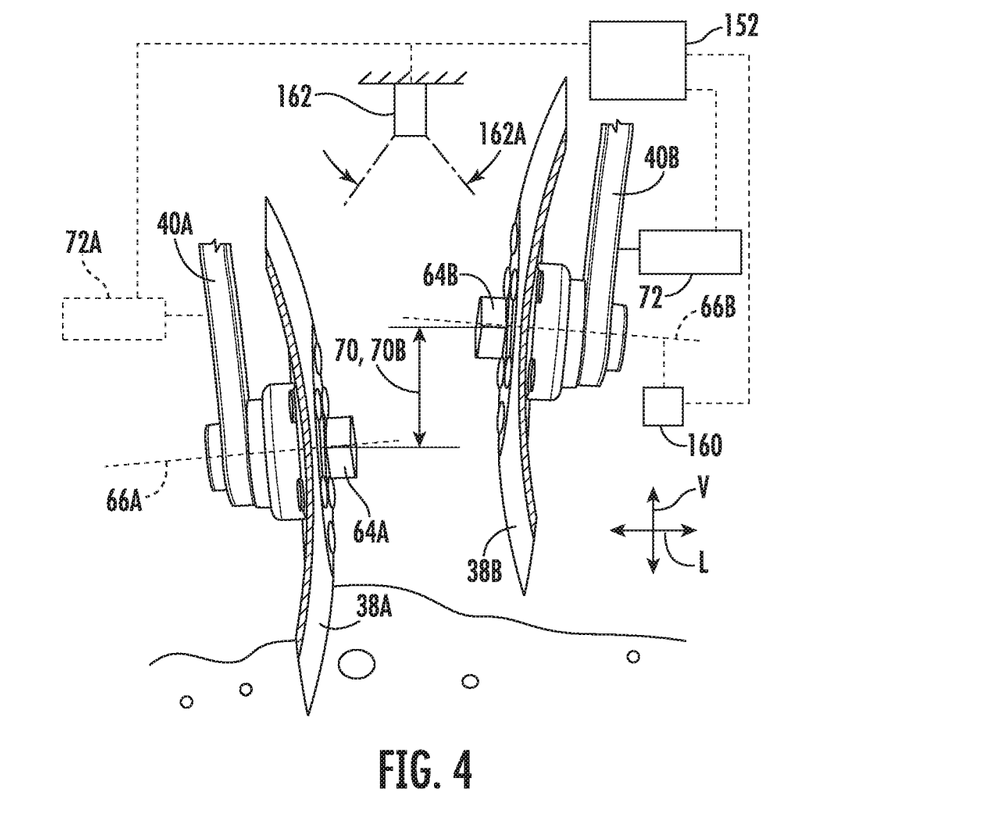
FIG. 4 illustrates a rear view of the closing assembly shown in FIG. 3, particularly illustrating the closing assembly after a vertical actuation of at least one closing tool of the closing assembly in accordance with aspects of the present subject matter.
Figure 5:
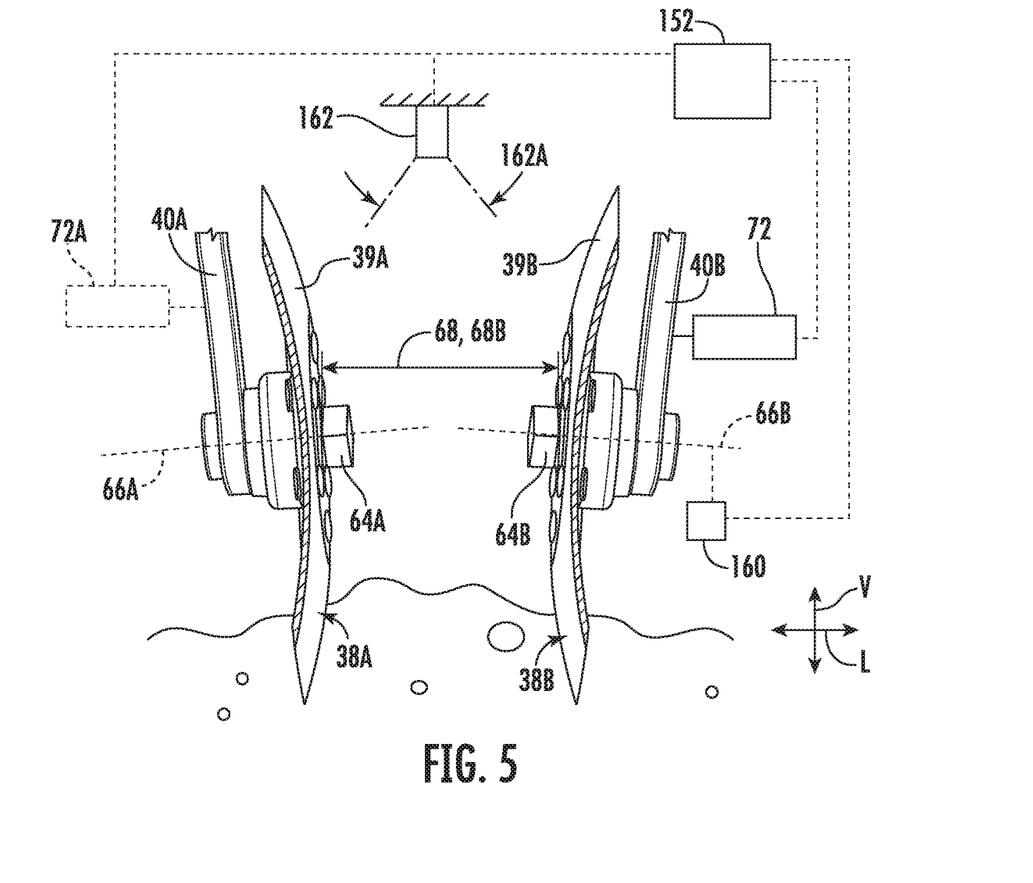
FIG. 5 illustrates a rear view of the closing assembly shown in FIG. 3, particularly illustrating the closing assembly after a lateral actuation of at least one closing tool of the closing assembly in accordance with aspects of the present subject matter.
Figure 6:
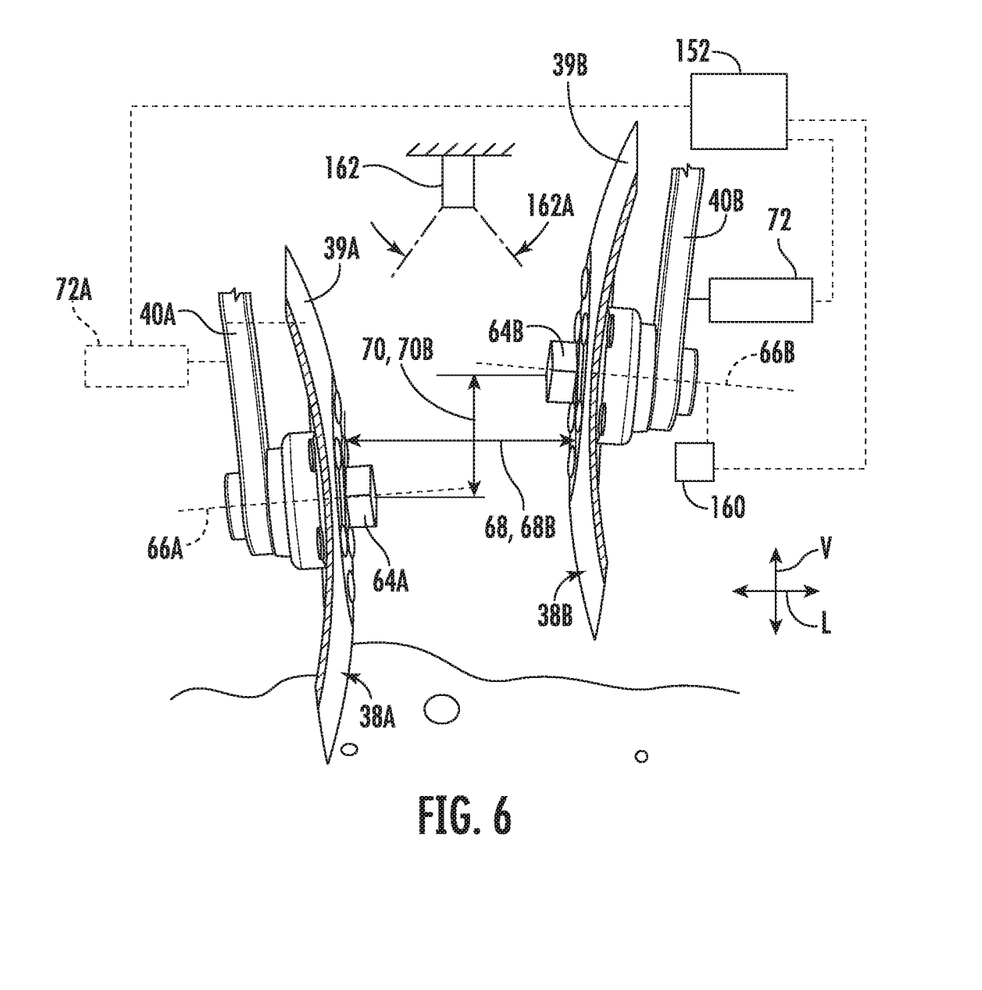
FIG. 6 illustrates a rear view of the closing assembly shown in FIG. 3, particularly illustrating the closing assembly after a vertical and lateral actuation of at least one closing tool of the closing assembly in accordance with aspects of the present subject matter.

Referring now to FIGS. 3-6 various views of one embodiment of a closing assembly (e.g., the closing assembly 36 shown in FIG. 2) are illustrated in accordance with aspects of the present subject matter. Specifically, FIG. 3 illustrates a rear view of the closing assembly 36 described above with reference to FIG. 2, particularly showing the closing assembly 36 with a given amount of material accumulated relative to the closing discs 38. FIG. 4 illustrates a rear view of the closing assembly 36 shown in FIG. 3, particularly illustrating the closing assembly after one of the closing discs has been vertically actuated relative to other closing disc. FIG. 5 illustrates another rear view of the closing assembly 36 shown in FIG. 3, particularly illustrating the closing assembly after one or both of the closing discs have been laterally actuated to adjust the lateral spacing defined between the discs. Additionally, FIG. 6 illustrates a further rear view of the closing assembly 36 shown in FIG. 3, particularly illustrating the closing assembly after one of the closing discs has been vertically and laterally actuated relative to other closing disc.

As indicated above, each closing assembly 36 may generally include a pair of closing discs 38. In general, in accordance with aspects of the present subject matter each pair of closing discs 38 is configured such that the positioning of one or both of the closing discs 38 may be adjusted to reduce the amount of material accumulation relative to the respective closing assembly 36. Specifically, in several embodiments, one or both of the closing discs 38 may be moved or actuated from a respective "working position," at which the closing disc(s) is configured to assist in closing a furrow, to a respective "material removal position," at which the closing disc(s) 38 is positioned to allow at least a portion of any material accumulated at or near the closing disc(s) 38 to be removed or otherwise pass by the disc(s) 38 as the implement 10 is being operated within the field. Once the material accumulation has been removed, the closing disc(s) 38 may be moved or actuated back to its respective working position.

As particularly shown in the illustrated embodiment, a first closing disc 38A of the pair of closing discs 38 may be supported relative to the frame 24 by a first support arm 40A and a second closing disc 38B of the pair of closing discs 38 may be supported relative to the frame 24 by a second support arm 40B. The first and second support arms 40A, 40B may be configured the same as or similar to the support arm 40 described above with reference to FIG. 2, or may correspond to portions of such support arm 40. Each closing disc 38A, 38B is configured to rotate relative to its respective support arm 40A, 40B. For example, the first closing disc 38A is rotatably coupled to the first support arm 40A via a first rotational coupling 64A (e.g., formed by a pivot pin or shaft) and the second closing disc 38B is rotatably coupled to the second support arm 40B via a second rotational coupling 64B (e.g., formed by a pivot pin or shaft). Each of the rotational couplings 64A, 64B defines a respective rotational axis 66A, 66B at the respective geometric center of the disc 38A, 38B about which the respective closing disc 38A, 38B rotates. In this regard, the rotational couplings 64A, 64B allow the closing discs 38A, 38B to not only rotate relative to the support arms 40A, 40B, but to also rotate relative to the ground as the implement 10 is moved across a field during an agricultural operation to work the soil, e.g., to close a furrow in the soil.

During operation of the implement 10, the relative lateral and/or vertical positioning of the closing discs 38A, 38B is generally selected based on the desired performance and/or operating parameters of the closing assembly 26. More particularly, the inner surfaces 39A, 39B of the closing discs 38A, 38B may be spaced apart along a lateral direction L by a lateral distance 68 at or adjacent to the centers of the discs 38A, 38B. Additionally, the centers of the discs 38A, 38B, and therefore the rotational axes 66A, 66B, of the closing discs 38A, 38B may be spaced apart along a vertical direction V by a vertical distance 70. As will be described below, the lateral and/or vertical distances 68, 70 may be adjusted depending on one or more operational parameters, including based on the detection of plugging or material accumulation relative to the closing discs.

As indicated above, the closing discs 38A, 38B may be actuatable between respective working positions and material removal positions. Generally, in accordance with aspects of the present subject matter, one or both of the closing discs 38A, 38B may be moved from its working position to a material removal position to allow material accumulation relative to the closing discs 38 to be reduced. In this regard, the material removal position may generally represent a change in the lateral distance 68 between the inner surfaces 39A, 39B of the closing discs 38A, 38B at or adjacent to the centers of the discs 38A, 38B and/or a change in the vertical distance 70 between the centers or rotational axes 66A, 66B of the closing discs 38A, 38B as compared to such distance(s) 68, 70 when the closing discs 38A, 38B are located at their working positions.

As shown in FIG. 3, when each closing disc 38A, 38B is in its respective working position, the inner surfaces 39A, 39B at or adjacent to the centers of the closing discs 38A, 38B are spaced apart by a working lateral distance 68A. Additionally, when the closing discs 38A, 38B are at their working positions, the centers, and therefore the rotational axes 66A, 66B, of the closing discs 38A, 38B are spaced apart by a working vertical distance 70A. In some embodiments, as shown in FIG. 3, the closing discs 38A, 38B are positioned to evenly work the ground such that the working vertical distance 70A defined between the rotational axes 66A, 66B of the closing discs 38A, 38B is essentially zero when at the working positions. However, it should be appreciated that the closing discs 38A, 38B may otherwise be positioned such that working vertical distance 70 may be any other suitable distance.

In some embodiments, when material accumulation is detected relative to the closing discs 38A, 38B, the lateral distance 68 between the inner surfaces 39A, 39B at or adjacent to the centers of the closing discs 38A, 38B may be changed by moving one or both of the closing discs 38A, 38B from their working positions shown in FIG. 3 to a laterally adjusted material removal position(s). For example, as shown in FIGS. 5 and 6, one or both of the closing discs 38A, 38B has been actuated laterally relative to its working position(s) shown in FIG. 3 such that the lateral distance 68 between the inner surfaces 39A, 39B of the closing discs 38A, 38B is equal to a material removal lateral distance 68B. The material removal lateral distance 68B, in the embodiments shown, is larger than the working lateral distance 68A. However, it should be appreciated that, in other embodiments, the material removal lateral distance 68B may instead be smaller than the working lateral distance 68A.

Additionally, in some embodiments, when material accumulation is detected relative to the closing discs 38A, 38B, the vertical distance 70 between the rotational axes 66A, 66B of the closing discs 38A, 38B may be changed by moving one or both of the closing discs 38A, 38B from their working positions shown in FIG. 3 to a vertically adjusted material removal position(s). For example, in the embodiments shown in FIGS. 4 and 6, the second closing disc 38B has been actuated vertically such that the vertical distance 70 between the centers, and therefore the rotational axes 66A, 66B, of the closing discs 38A, 38B is equal to a material removal vertical distance 70B. The material removal vertical distance 70B is, in some embodiments, greater than the working vertical distance 70A. It should be appreciated that, while only one of the closing discs 38A, 38B is shown as being moved from its working position to a material removal position in FIGS. 4 and 6, in other embodiments, both of the closing discs 38A, 38B may be actuated relative to their working positions to facilitate removal of any accumulated material. Additionally, while the second closing disc 38B is shown as being raised in its material removal position relative to its working position, the closing discs 38A, 38B may alternatively be lowered from the working positions to the material removal positions.

Additionally, as described above, in some embodiments, when material accumulation is detected relative to the closing discs 38A, 38B, both the lateral distance 68 between the inner surfaces 39A, 39B of the closing discs 38A, 38B and the vertical distance 70 between the centers or rotational axes 66A, 66B of the closing discs 38A, 38B may be changed by moving one or both of the closing discs 38A, 38B from their working positions shown in FIG. 3, to a vertically/laterally adjusted material removal position(s). For example, as shown in FIG. 6, the second closing disc 38B has been actuated both laterally and vertically relative to the other disc 38A such that the lateral distance 68 between the inner surfaces 39A, 39B of the closing discs 38A, 38B is equal to a material removal lateral distance 68B that differs from the working lateral distance 68A, and the vertical distance 70 between the centers or rotational axes 66A, 66B of the closing discs 38A, 38B is equal to a material removal vertical distance 70B that differs from the working vertical distance 70A.

It should be appreciated that, one or more actuators may be configured to adjust the position of one or both of the closing discs 38A, 38B between the working position(s) and the material removal position(s). For example, a position actuator 72 may be configured to actuate the second closing disc 38B between its working position (FIG. 3) and a corresponding material removal position (FIGS. 4-6). In some embodiments, the position actuator 72 may be configured to actuate the second support arm 40B, and thus, the attached second closing disc 38B between its working position and material removal positions. However, in other embodiments, the position actuator 72 may have any other suitable configuration that allows it to actuate the second closing disc 38B between its working position and material removal positions. For example, in some embodiments, the second closing disc 38B may be actuatable independently of the second support arm 40B.

While the position actuator 72 is shown as being capable of adjusting both the vertical and lateral positioning of the second closing disc 38B, the position actuator 72 may, in other embodiments, only be configured to adjust one of the vertical positioning or the lateral positioning of the second closing disc 38B. In such embodiments, an additional actuator may be included to adjust the other of the vertical positioning or the lateral positioning, if such adjustment of the other of the vertical positioning or lateral positioning is necessary.

It should be appreciated that, in some embodiments, the position actuator 72 may be additionally configured to adjust the positioning of the first closing disc 38A between its working and material removal positions relative to the second closing disc 38B. Alternatively, in other embodiments, a second actuator, such as an auxiliary position actuator 72A (shown in dashed lines), may be configured to adjust the positioning of the first closing disc 38A between its working and material removal positions relative to the second closing disc 38B. In such embodiments, the auxiliary position actuator 72A may be configured the same as or similar to the position actuator 72.

In general, the position actuator(s) 72, 72A may correspond to any suitable device configured to adjust the position of one or both of the closing discs 38A, 38B between the working and material removal positions. For example, in one embodiment, the position actuator(s) 72, 72A may correspond to a fluid-driven actuator, such as a hydraulic or pneumatic cylinder. However, it should be appreciated that the position actuator(s) 72, 72A may correspond to any other suitable type of actuator, such as an electric linear actuator or screw-type actuator.

As will be described below in greater detail with reference to the system shown in FIG. 7, the position actuator(s) 72, 72A may be controlled by an associated electronic controller based on data received from one or more sensors to adjust the positioning of one or both of the closing discs 38A, 38B between the working and material removal positions to reduce material accumulation relative to the closing assembly 36.

Figure 7:
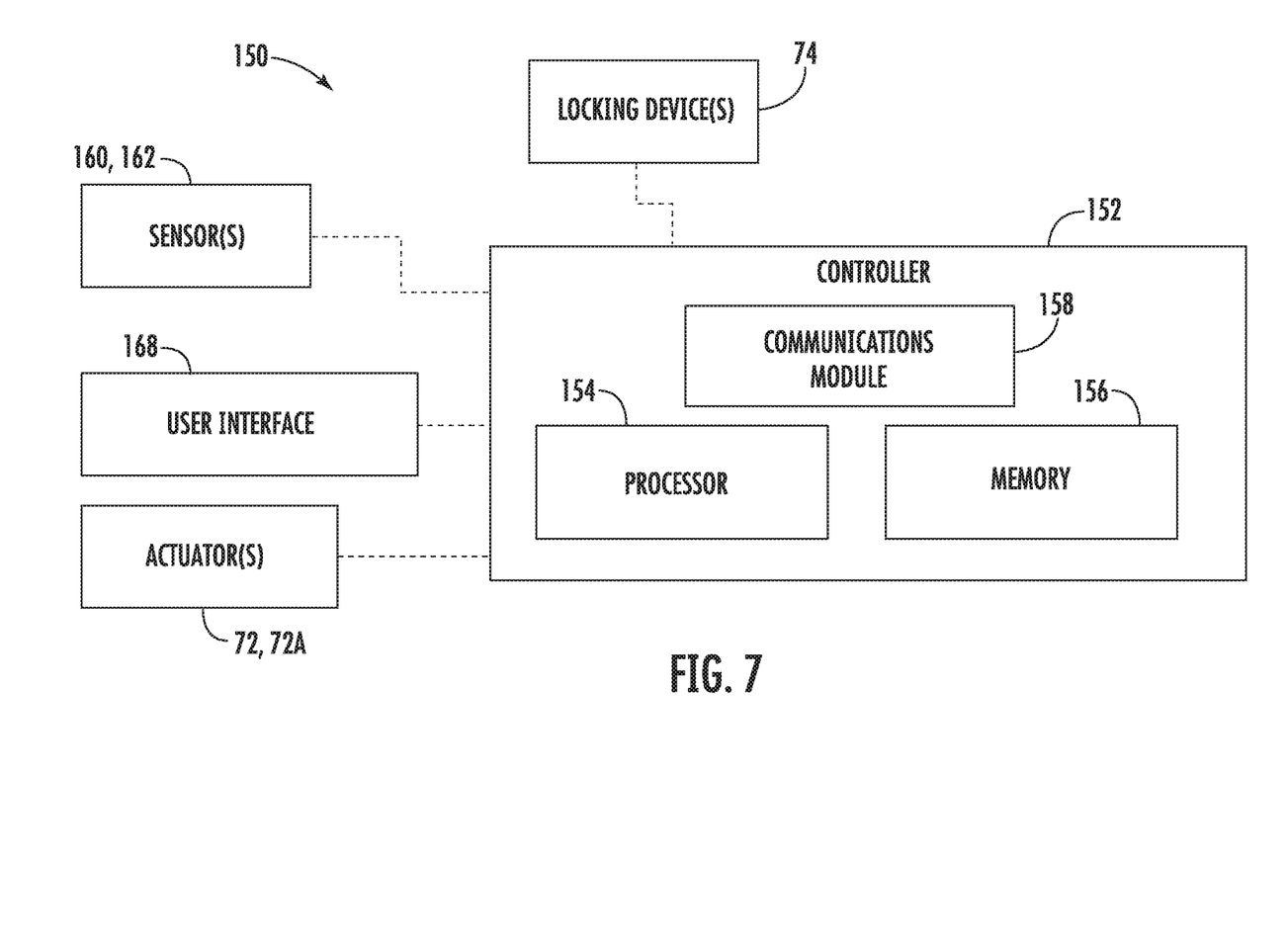
FIG. 7 illustrates a schematic view of one embodiment of a system for reducing material accumulation relative to a closing assembly of an agricultural implement in accordance with aspects of the present subject matter.

Referring now to FIG. 7, a schematic view of one embodiment of a system 150 for reducing material accumulation relative to a closing assembly of an agricultural implement is illustrated in accordance with aspects of the present subject matter. In general, the system 150 will be described herein with reference to the implement 10 and row unit 18 described above with reference to FIGS. 1 and 2 and the closing assembly 38 described above with reference to FIGS. 3-6. However, it should be appreciated by those of ordinary skill in the art that the disclosed system 150 may generally be utilized with agricultural implements/row units having any other suitable implement/unit configuration and/or with closing assemblies having any other suitable closing assembly configuration.

As shown in FIG. 7, the system 150 may include a controller 152 configured to electronically control the operation of one or more components of the agricultural implement 10. In general, the controller 152 may comprise any suitable processor-based device known in the art, such as a computing device or any suitable combination of computing devices. Thus, in several embodiments, the controller 152 may include one or more processor(s) 154, and associated memory device(s) 156 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 156 of the controller 152 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 156 may generally be configured to store suitable computer-readable instructions that, when implemented by the processor(s) 154, configure the controller 152 to perform various computer-implemented functions, such as one or more aspects of the methods and algorithms that will be described herein. In addition, the controller 152 may also include various other suitable components, such as a communications circuit or module, one or more input/output channels, a data/control bus and/or the like.

It should be appreciated that, in several embodiments, the controller 152 may correspond to an existing controller of the agricultural implement 10 and/or of the work vehicle to which the implement 10 is coupled. However, it should be appreciated that, in other embodiments, the controller 152 may instead correspond to a separate processing device. For instance, in one embodiment, the controller 152 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 152 may be configured to include a communications module or interface 158 to allow for the controller 152 to communicate with any of the various other system components described herein. For instance, as described above, the controller 152 may, in several embodiments, be configured to receive data inputs from one or more sensors of the agricultural implement 10 that are used to detect one or more parameters associated with material accumulation relative to the closing assembly 36, such as one or more rotational speed sensors 160 and/or one or more vision-based sensors 162. The controller 152 may be communicatively coupled to the sensor(s) 160, 162 via any suitable connection, such as a wired or wireless connection, to allow data indicative of material accumulation relative to the closing assembly 36 to be transmitted from the sensor(s) 160, 162 to the controller 152.

Specifically, referring back to FIGS. 2-6, each closing assembly 36 may, for example, include or be associated with a vision-based sensor 162 installed or otherwise positioned relative to the closing discs 38A, 38B to capture data (e.g., images, position data, and/or the like) indicative of the material accumulation relative to the closing assembly 36, such as imagery of the area adjacent to the closing discs 38A, 38B and/or a distance to the material in front of, between, and/or behind the closing discs 38A, 38B. In this regard, the vision-based sensor 162 may, for instance, have a sensor detection range or field of view 162A (FIGS. 3-6) that includes at least a portion of the area in front of, between, and/or behind the closing discs 38A, 38B. It should be appreciated that each vision-based sensor 162 may be configured as, e.g., cameras (including IR cameras, stereo cameras, and/or the like), LIDAR devices and other laser-based sensors, fluorescence or reflectance sensors, radar sensors (including ground-penetrating radars and other electromagnetic-based sensors), ultrasound sensors, and/or the like.

In addition to the vision-based sensor 162 (or as an alternative thereto), as shown in FIGS. 3-6, each closing assembly 36 may include or be associated with at least one rotational speed sensor 160 installed or otherwise positioned relative to a respective one of the rotational axes 66A, 66B of the closing discs 38A, 38B to capture data indicative of material accumulation relative to the closing assembly 36, such as a rotational speed of one or both of the closing discs 38A, 38B. Alternatively, any other suitable sensor or sensing device may be provided in operative association with each closing assembly 36 that allows for the detection of material accumulation relative to the closing assembly 36, such as, for example, a position sensor at the assembly connecting the closing discs 38A, 38B to the chassis arm 42 and/or a pressure sensor configured to measure pressure applied to the closing discs 38A, 38B by material accumulation.

In several embodiments, the controller 152 may be configured to determine the presence and/or amount of material accumulation relative to the closing discs 38A, 38B based on the data received from the sensors 160, 162. For example, the controller 152 may include one or more suitable algorithms stored within its memory 156 that, when executed by the processor 154, allow the controller 152 to determine the presence and/or amount of material accumulation relative to the closing assembly 36 based on the data received from the one or more sensors 160, 162. The controller 152 may further be configured to monitor the status of the material accumulation formed relative to the closing assembly 36 periodically, continuously, or only as demanded by an operator of the implement 10. For example, in some embodiments, the controller 152 may collect data from one or more of the sensor(s) 160, 162 periodically based on some predetermined delay period or sampling frequency, such as after a predetermined period of time (e.g., a set amount of operating time), after a certain operating distance covered (e.g., a set amount of acres worked by the implement 10), and/or the like.

Further, the controller may be configured to perform one or more implement-related control actions based on the data received from the sensors 160, 162. Specifically, the controller 152 may be configured to control one or more components of the agricultural implement 10 based on the material accumulation detected relative to the closing assembly 36. For example, as shown in FIG. 7, the controller 152 may be configured to control the position actuator(s) 72, 72A associated with the first and second closing discs 38A, 38B. For instance, the controller 152 may be configured to control the positioning of at least one of the first closing disc 38A or the second closing disc 38B when a given amount of material accumulation is detected relative to the closing assembly 36. More specifically, the controller 152 may be configured to control the position actuator(s) 72, 72A to temporarily move at least one of the first closing disc 38A or the second closing disc 38B from its working position to a corresponding material removal position when it is determined that the material accumulation relative to the closing assembly 36 needs to be reduced. The controller 152 may further be configured to control the position actuator(s) 72, 72A to move the at least one of the first closing disc 38A or the second closing disc 38B from its corresponding material removal position back to its working position. For instance, the controller 152 may control the position actuator(s) 72, 72A to move the at least one of the first closing disc 38A or the second closing disc 38B from its corresponding material removal position back to its working position once the material accumulation relative to the closing assembly 36 is sufficiently reduced.

In some embodiments, the controller 152 may be configured to perform one or more control actions to reduce material accumulation based on one or more operations of the implement 10 and/or a position of the implement 10 within the field. For example, in one embodiment, the controller 152 may be configured to receive seed placement data, e.g., from a seed tube sensor, and to perform one or more control actions between, or substantially between, placements of seeds within a trench. In some embodiments, the seed tube sensor may detect seeds as they are discharged from a seed meter. In such embodiments, by knowing the speed of the implement 10, the controller 152 may estimate when seeds will be encountered by the closing assembly 36 based on the seed data received from the seed tube sensor. Alternatively, a separate sensor may be used to provide seed placement data. For instance, in one embodiment, the vision sensor(s) 162 may be used to detect the timing of when seeds are being encountered by the closing assembly 36.

Based on the seed placement data, the controller 152 may be configured to actuate one or both of the discs 38A, 38B from its working position to its material removal position and back between seed encounters such that each seed is at least partially covered in a trench. For instance, the controller 152 may be configured to actuate one of the discs 38A, 38B such that the disc 38A, 38B is quickly moved to its material remove position immediately after a seed is encountered by the closing assembly 36 and then quickly moved back to its working position prior to the next seed being encountered by the closing assembly 36. Alternatively, the controller 152 may be configured to perform one or more control actions at desired positions within the field, e.g., during headland turns. For example, the controller 152 may be configured to delay the actuation of one or both of the discs 38A, 38B from its working position to its material removal position and back until the implement 10 is about to make or is making a headland turn, to at least partially cover each seed in a trench.

Alternatively, in some embodiments, the controller 152 may be configured to control one or more locking devices in order to reduce material accumulation relative to the closing assembly 36. For instance, as shown in FIG. 7, the controller 152 may be communicatively coupled to locking device(s) 74. The locking device(s) 74 may be configured to selectively lock at least one of the first closing disc 38A or the second closing disc 38B relative to the position actuator(s) 72, 72A and/or relative to the other of the first closing disc 38A or the second closing disc 38B. For example, when the locking device(s) 74 is unlocked, the at least one of the first closing disc 38A or the second closing disc 38B may be movable between its working position and material removal position independently of actuation of the position actuator(s) 72, 72A. Conversely, when the locking device(s) 74 is locked, the at least one of the first closing disc 38A or the second closing disc 38B is only movable between its working position and material removal position with actuation of the position actuator(s) 72, 72A. As such, the controller 152 may be configured to control at least one of the one or more locking devices 74 to unlock when it is determined that the material accumulation relative to the closing assembly 36 needs to be reduced, such that ground force acting on the closing discs 38, 38A actuates at least one of the first closing disc 38A or the second closing disc 38B from its working position to its material removal position. Thereafter, the controller 152 may be configured to control the at least one of the one or more locking devices 74 to lock such that the position actuator(s) 72, 72A may move the at least one of the first closing disc 38A or the second closing disc 38B back into its working position from the material removal position.

Additionally, in some embodiments, the controller 152 may be configured to indicate to an operator the amount of material accumulation detected relative to the closing assembly 36. For example, in the embodiment shown in FIG. 7, the communications module 158 may allow the controller 152 to communicate with a user interface 168 having a display device configured to display information regarding the amount of material accumulation detected relative to the closing assembly 36. However, it should be appreciated that the controller 152 may instead be coupled to any number of other indicators, such as lights, alarms and/or the like to provide an indicator to the operator regarding the material accumulation formed relative to the closing assembly 36.

Figure 8:
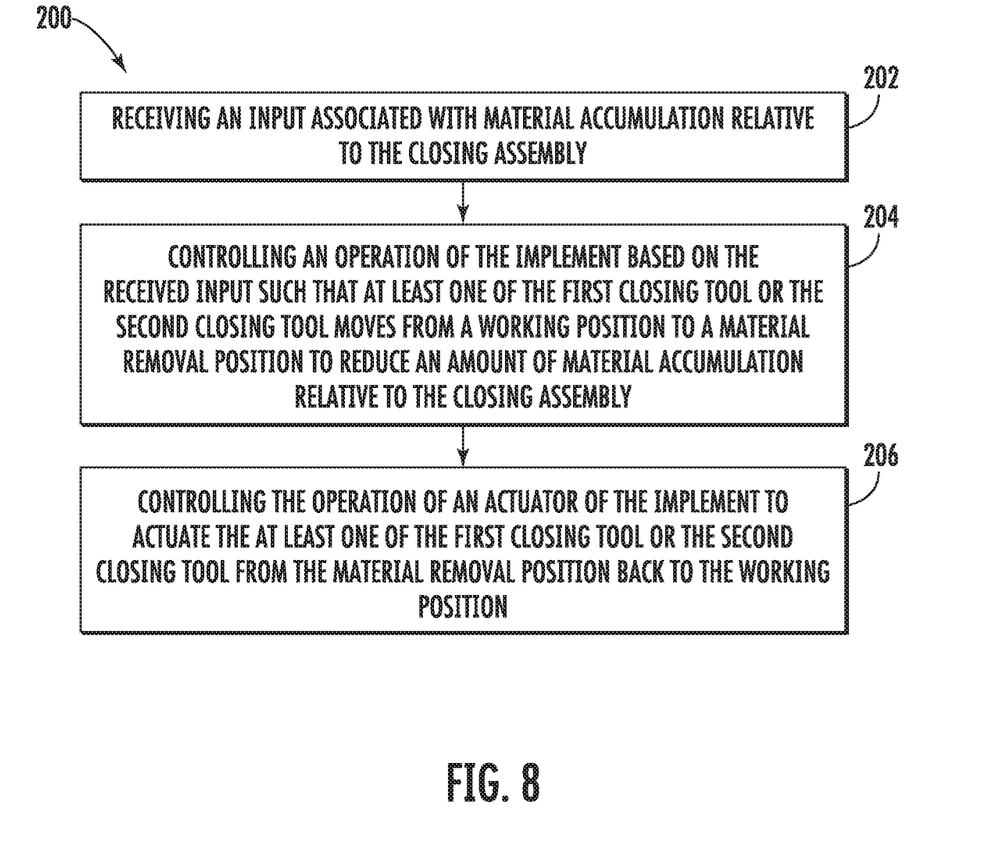
FIG. 8 illustrates a flow diagram of one embodiment of a method for reducing material accumulation relative to a closing assembly of an agricultural implement in accordance with aspects of the present subject matter.

Referring now to FIG. 8, a flow diagram of one embodiment of a method 200 for reducing material accumulation relative to a closing assembly of an agricultural implement is illustrated in accordance with aspects of the present subject matter. In general, the method 200 will be described herein with reference to the closing assembly 36 shown in FIGS. 3-6 and the system 150 shown in FIG. 7. However, it should be appreciated that the disclosed method 200 may be executed with implements and/or assemblies having any other suitable configurations and/or with systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 8, at (202), the method 200 may include receiving an input associated with material accumulation relative to the closing assembly. For instance, as described above, the controller 152 may be configured to receive an input(s) from one or more sensors configured to provide an indication of material accumulation relative to the closing assembly 36, such as one or more rotational speed sensors 160 and/or one or more vision-based sensors 162.

Additionally, at (204), the method 200 may include controlling an operation of an actuator of the implement to actuate at least one of the first closing tool or the second closing tool from a working position to a material removal position based on the received input to reduce an amount of material accumulation relative to the closing assembly. For instance, as described above, upon detection of material accumulation via the sensor(s) 160, 162, the controller 152 may be configured to control the operation of the actuator(s) 72, 72A to actuate at least one of the first or second closing discs 38A, 38B from its respective working position to its respective material removal position to reduce material accumulation relative to the closing assembly 36.

Moreover, at (206), the method 200 may include controlling the operation of the actuator of the implement to actuate the at least one of the first closing tool or the second closing tool from the material removal position back to the working position. For instance, as described above, following actuation of the closing disc(s) 38A, 38B to the material removal position, the controller 152 may be configured to control the operation of the actuator(s) 72, 72A such that the disc(s) 38A, 38B is moved back to its respective working position.

Figure 9:
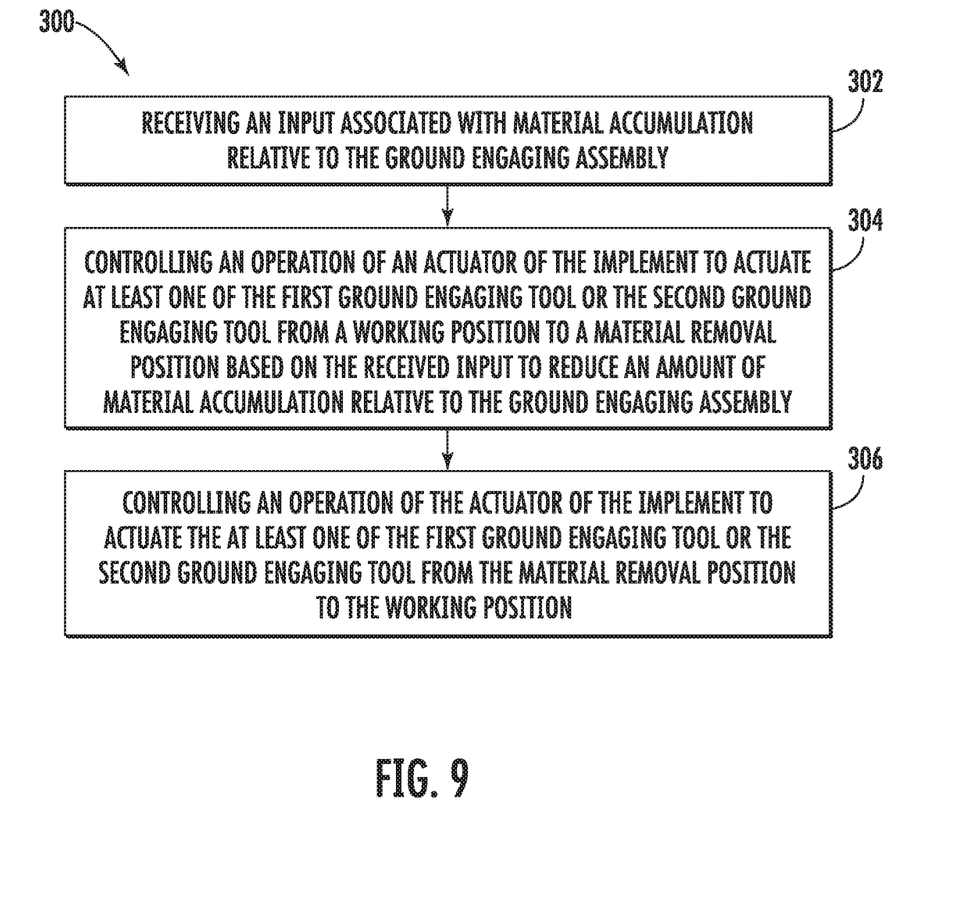
FIG. 9 illustrates a flow diagram of another embodiment of a method for reducing material accumulation relative to a ground engaging assembly of an agricultural implement in accordance with aspects of the present subject matter.

Referring now to FIG. 9, a flow diagram of another embodiment of a method 300 for reducing the material accumulation relative to a ground engaging assembly of an agricultural implement is illustrated in accordance with aspects of the present subject matter. In general, the method 300 will be described herein with reference to the closing assembly 36 shown in FIGS. 3-6, and the system 150 shown in FIG. 7. However, it should be appreciated that the disclosed method 300 may be executed with implements and/or assemblies having any other suitable configurations and/or with systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 9, at step (302), the method 300 may include receiving an input associated with material accumulation relative to the ground engaging assembly. For instance, as described above, the controller 152 may be configured to receive an input(s) from one or more sensors configured to provide an indication of material accumulation relative to the closing assembly 36, such as one or more rotational speed sensors 160 and/or one or more vision-based sensors 162. Alternatively, the controller 152 may be configured to receive an input(s) from one or more sensors configured to provide an indication of material accumulation relative to adjacent residue removal wheel(s) 52.

Additionally, at step (304), the method 300 may include controlling an operation of an actuator of the implement to actuate at least one of the first ground engaging tool or the second ground engaging tool from a working position to a material removal position based on the received input to reduce an amount of material accumulation relative to the ground engaging assembly. For instance, as described above, upon detection of material accumulation via the sensor(s) 160, 162, the controller 152 may be configured to control the operation of the actuator(s) 72, 72A to actuate at least one of the first or second closing discs 38A, 38B from its respective working position to its respective material removal position to reduce material accumulation relative to the closing assembly 36.

Moreover, at step (306), the method 300 may include controlling an operation of the actuator of the implement to actuate the at least one of the first ground engaging tool or the second ground engaging tool from the material removal position to the working position. For instance, as described above, following actuation of the closing disc(s) 38A, 38B to the material removal position, the controller 152 may be configured to control the operation of the actuator(s) 72, 72A such that the disc(s) 38A, 38B is moved back to its respective working position.

It is to be understood that, in several embodiments, the steps of the methods 200, 300 are performed by the controller 152 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 152 described herein, such as the methods 200, 300, are implemented in software code or instructions which are tangibly stored on a tangible computer readable medium. The controller 152 loads the software code or instructions via a direct interface with the computer readable medium or via a wired and/or wireless network. Upon loading and executing such software code or instructions by the controller 152, the controller 152 may perform any of the functionality of the controller 152 described herein, including any steps of the methods 200, 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing material accumulation relative to a closing assembly of an agricultural implement, the closing assembly including first and second closing tools configured to engage soil within a field as the agricultural implement is moved across the field, the method comprising:

receiving, at a computing device, an input associated with material accumulation relative to the closing assembly;

controlling, with the computing device, an operation of the implement based on the received input such that at least one of the first closing tool or the second closing tool moves from a working position to a material removal position to reduce an amount of material accumulation relative to the closing assembly; and controlling, with the computing device, an operation of an actuator of the implement to actuate the at least one of the first closing tool or the second closing tool from the material removal position back to the working position.

2. The method of claim 1, wherein, when in the working position, each of the first and second closing tools is operable to assist in closing a furrow formed in the soil as the agricultural implement is moved across the field.

3. The method of claim 1, wherein each of the first and second closing tools is rotatable about a respective rotational axis extending through a center of the tool, and wherein the operation of the implement is controlled such that the at least one of the first closing tool or the second closing tool moves in a manner that increases a lateral distance defined between the centers of the first and second closing tools.

4. The method of claim 1, wherein each of the first and second closing tools is rotatable about a respective rotational axis, wherein the operation of the implement is controlled such that the at least one of the first closing tool or the second closing tool moves in a manner that increases a vertical distance defined between the rotational axes of the first and second closing tools.

5. The method of claim 4, wherein each respective rotational axis extends through a center of the tool, and wherein the operation of the implement is controlled such that the at least one of the first closing tool or the second closing tool moves in a manner that increases both the vertical distance defined between the rotational axes of the first and second closing tools and a lateral distance defined between the centers of the first and second closing tools.

6. The method of claim 1, wherein the input is received from one or more sensors configured to detect one or more parameters associated with material accumulation relative to the closing assembly.

7. The method of claim 6, wherein the one or more sensors are configured to detect a rotational speed of at least one of the first closing tool or the second closing tool and/or vision-based data indicative of the material accumulation relative to the closing assembly.

8. The method of claim 1, wherein controlling the operation of the implement based on the received input such that at least one of the first closing tool or the second closing tool moves from the working position to the material removal position comprises actuating at least one locking device associated with the at least one of the first closing tool or the second closing tool.

9. The method of claim 1, wherein controlling the operation of the implement based on the received input such that at least one of the first closing tool or the second closing tool moves from the working position to the material removal position comprises controlling the actuation of the actuator.

10. The method of claim 1, wherein each closing tool is configured as a closing disc.

11. A method for reducing material accumulation relative to a ground engaging assembly of an agricultural implement, the ground engaging assembly including first and second ground engaging tools configured to rotate relative to and engage soil within a field as the agricultural implement is moved across the field, the method comprising:

receiving, at a computing device, an input associated with material accumulation relative to the ground engaging assembly;

controlling, with the computing device, an operation of an actuator of the implement based on the received input to actuate at least one of the first ground engaging tool or the second ground engaging tool from a working position to a material removal position to reduce an amount of material accumulation relative to the ground engaging assembly; and controlling, with the computing device, an operation of the actuator of the implement to actuate the at least one of the first ground engaging tool or the second ground engaging tool from the material removal position to the working position.

12. A system for reducing material accumulation relative to a closing assembly of an agricultural implement, the system comprising:

first and second closing tools configured to engage soil within a field as the agricultural implement is moved across the field;

an actuator configured to actuate at least one of the first closing tool or the second closing tool between a working position and a material removal position; and a controller configured to:
control an operation of the implement such that the at least one of the first closing tool or the second closing tool moves from the working position to the material removal position upon receiving an input associated with material accumulation relative to the closing assembly, and control an operation of the actuator to actuate the at least one of the first closing tool or the second closing tool from the material removal position to the working position.

13. The system of claim 12; wherein, when in the working position, each of the first and second closing tools is operable to assist in closing a furrow formed in the soil as the agricultural implement is moved across the field.

14. The system of claim 12, wherein each of the first and second closing tools is rotatable about a respective rotational axis extending through a center of the tool, and wherein the operation of the implement is controlled such that the at least one of the first closing tool or the second closing tool moves in a manner that increases a lateral distance defined between the centers of the first and second closing tools.

15. The system of claim 12, wherein each of the first and second closing tools is rotatable about a respective rotational axis, wherein the operation of the implement is controlled such that the at least one of the first closing tool or the second closing tool moves in a manner that increases a vertical distance defined between the rotational axes of the first and second closing tools.

16. The system of claim 15, wherein each respective rotational axis extends through a center of the tool, and wherein the operation of the implement is controlled such that the at least one of the first closing tool or the second closing tool moves in a manner that increases both the vertical distance defined between the rotational axes of the first and second closing tools and a lateral distance defined between the centers of the first and second closing tools.

17. The system of claim 12, further comprising one or more sensors configured to detect one or more parameters associated with material accumulation relative to the closing assembly, wherein the input is received from the one or more sensors.

18. The system of claim 12, further comprising at least one locking device, wherein controlling the operation of the implement such that the at least one of the first closing tool or the second closing tool moves from the working position to the material removal position comprises controlling an operation of the at least one locking device.

19. The system of claim 12, wherein controlling the operation of the implement such that the at least one of the first closing tool or the second closing tool moves from the working position to the material removal position comprises controlling the operation of the actuator.

20. The system of claim 12, wherein the agricultural implement is a planting implement, and wherein each closing tool is configured as a closing disc.

\* \* \* \* \*